(12) United States Patent
Shvodian et al.

(10) Patent No.: US 7,724,783 B2
(45) Date of Patent: May 25, 2010

(54) SYSTEM AND METHOD FOR PASSING DATA FRAMES IN A WIRELESS NETWORK

(75) Inventors: William M. Shvodian, McLean, VA (US); John W. McCorkle, Vienna, VA (US); Paul R. Runkle, Durham, NC (US); Timothy R. Miller, Arlington, VA (US); Matthew L. Welborn, Vienna, VA (US); Douglas E. Price, Sterling, VA (US); Adrian R. Macias, Vista, CA (US); Richard D. Roberts, West Melborne, FL (US); Deepak M. Joseph, Fairfax, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1308 days.

(21) Appl. No.: 10/546,752

(22) PCT Filed: Feb. 27, 2004

(86) PCT No.: PCT/US2004/003362

§ 371 (c)(1),
(2), (4) Date: Aug. 25, 2005

(87) PCT Pub. No.: WO2004/079970

PCT Pub. Date: Sep. 16, 2004

(65) Prior Publication Data

US 2006/0187909 A1 Aug. 24, 2006

Related U.S. Application Data

(60) Provisional application No. 60/450,315, filed on Feb. 28, 2003, provisional application No. 60/535,758, filed on Jan. 12, 2004.

(51) Int. Cl.
*H04J 3/06* (2006.01)
*H04B 1/00* (2006.01)
*H03H 7/30* (2006.01)
*H03H 7/40* (2006.01)
*H03K 5/159* (2006.01)

(52) U.S. Cl. .................. 370/515; 370/507; 370/509; 370/512; 370/513; 375/149; 375/230; 375/231

(58) Field of Classification Search .................. None
See application file for complete search history.

(56) References Cited

U.S. PATENT DOCUMENTS

| 5,636,252 | A | * | 6/1997 | Patel et al. ................. 375/345 |
| 2003/0072284 | A1 | * | 4/2003 | Webster et al. ............. 370/335 |
| 2003/0137966 | A1 | | 7/2003 | Odman et al. |
| 2003/0169711 | A1 | * | 9/2003 | Borowski et al. .......... 370/338 |
| 2004/0151109 | A1 | * | 8/2004 | Batra et al. ................. 370/208 |
| 2005/0195930 | A1 | * | 9/2005 | Spital et al. ................ 375/368 |

OTHER PUBLICATIONS

Notification of the First Office Action dated Jul. 11, 2008 in corresponding Chinese Patent Application No. 200480005356.9 (English translation thereof).

* cited by examiner

*Primary Examiner*—Daniel J Ryman
*Assistant Examiner*—Christopher Crutchfield

(57) ABSTRACT

A method is provided for receiving a data frame in an ultrawide bandwidth network. In this method, a device receives an ultrawide bandwidth signal containing a data frame. The device then performs an acquisition operation during a first preamble in the data frame, and identifies a marker after the first preamble that indicates that the first preamble has ended. After this, the device performs a signal processing operation during a second preamble in the data frame. After the training, the device then receives a header in the data frame, and then receives a payload in the data frame. By having a marker between the two preambles, this method provides a receiving device with critical information regarding the timing of the preamble section of a frame.

15 Claims, 5 Drawing Sheets

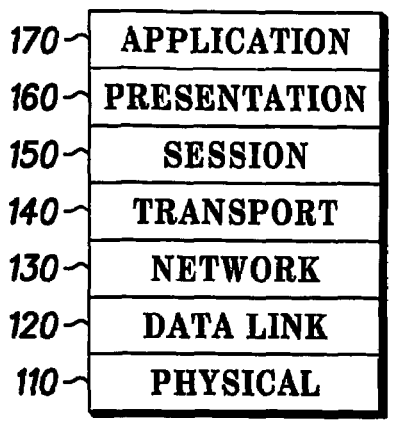
__100__ *FIG. 1*
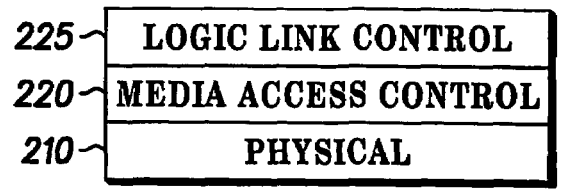
__200__ *FIG. 2*
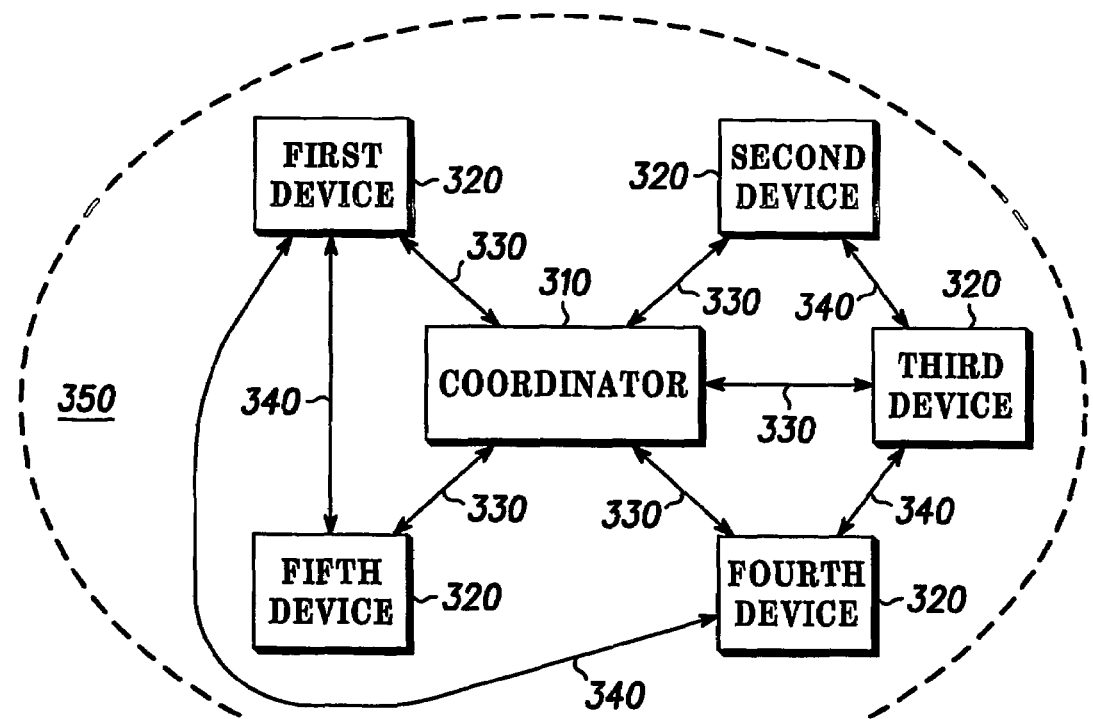
__300__ *FIG. 3*

SYSTEM AND METHOD FOR PASSING DATA FRAMES IN A WIRELESS NETWORK

CROSS-REFERENCE TO RELATED PATENT DOCUMENTS

This application relies for priority on U.S. provisional application Ser. No. 60/450,315, by William M. Shvodian et al., filed Feb. 28, 2003, entitled "PREAMBLE ARCHITECTURE FOR AN ULTRAWIDE BANDWIDTH SIGNAL" and U.S. provisional application Ser. No. 60/535,758, by William M. Shvodian et al., filed Jan. 12, 2004, entitled "DATA FRAME STRUCTURE," the contents of all of which are hereby incorporated by reference in their entirety.

FIELD OF THE INVENTION

The present invention relates in general to wireless communication systems, such as ultrawide bandwidth (UWB) systems, including mobile transceivers, centralized transceivers, and related equipment. More specifically the present invention relates to the transmission of data between two wireless devices in a manner that allows the receiving device to better perform necessary functions prior to processing data.

BACKGROUND OF THE INVENTION

In wireless communications standards individual wireless devices often send information back and forth between each other in the form of discrete frames sent in wireless signals. Each of these frames contains some information to be passed, as well as some information to allow the receiving device to properly receive and decipher the information in the frame.

Because of differences in local clock operation and variances in signal transmission paths, it is generally necessary for a receiving device to synchronize the phase of an internal clock with the phase of a received signal before the signal can be processed. In many implementations a frame will include a preamble that is placed at the beginning of the frame which allows the receiving device an opportunity to synchronize with the incoming frame. This is often called acquiring or locking onto the signal containing the incoming frame.

A preamble is generally a known, recognizable, and repeated pattern of bits that the receiving device can look for. This pattern is often generated by a formula known to both the transmitting device and the receiving device, and which can be easily detected.

In order to successfully identify the preamble, the receiving device must operate using a local clock that is synchronized with the phase of the incoming signal. As a result, in attempting to lock onto the incoming signal, the receiving device will generally vary the phase of its local clock, attempting to find a phase at which it can successfully detect the bit pattern in the preamble. Once the receiving device successfully identifies the preamble, i.e., recognizes the bit pattern being sent in the preamble, it will have successfully synchronized its local clock with the phase of the received data frame, and will have locked onto the bit pattern. In a wireless device there are generally several levels of synchronization. A device can synchronize to an oscillator frequency of the incoming signal, to a symbol or chip being sent in the incoming signal, or to a series of bits being sent in the incoming signal. Generally a device will have to sequentially synchronize on increasing levels of the signal, building upon the synchronization with the lower levels.

In implementation, most devices that use preambles do not initialize the formula (e.g., the polynomial) used for generating the preamble to the same initial conditions in every frame. In other words, while a preamble will generally contain a known and repeated bit pattern, the start of that bit pattern will be essentially random with respect to the start of the preamble. As a result, once the receiving device successfully synchronizes with an incoming preamble, it has no way of knowing how much time remains before the preamble ends.

In a narrow band system, a receiver can use a carrier (i.e., energy) detection to determine when a preamble starts, and thus how much time remains. In a UWB system, however, the signals have low signal-to-noise (SNR) ratio, meaning energy detection is generally an undesirable solution.

This can be a problem in certain devices that require additional signal processing or receiver preparation before receiving information from a frame. For example, some devices may perform operations on an incoming signal to improve signal quality. These operations can tale the form of linear equalization, decision feedback equalization (DFE), fine automatic gain control (AGC), and/or the use of RAKE receivers. These processes take a certain amount of time to train before they are ready to operate. And since the receiving UWB device does not know how much time remains in the preamble after signal lock, it cannot determine whether there is sufficient time remaining for receiver training, AGC refinement, signal normalization, or the like.

This can be a problem because if the receiving device starts training and the preamble ends before the training is completed, the receiving device may not be able to successfully receive the incoming data without an unacceptable number of errors. This can also be a problem in embodiments that continue to refine acquisition (e.g., using multiple acquisition fingers). In this situation, since the receiver doesn't know when the preamble will end, it doesn't know if it has sufficient time to try and look for a better acquisition lock before it must start training. It then runs the risk of either wasting too much time refining acquisition lock so that it has insufficient time for training, or it might stop refining acquisition too early in an effort to make certain it will have enough time for training.

Accordingly, it would be desirable in the art for a solution to the problems associated with unknown relative signal lock timing, and further to the problems associated with trying to allow adequate time for receiver training when a receiving device has no way of knowing the remaining time in a preamble once signal lock is completed.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 1 is a diagram showing the hierarchy of the seven-layered OSI standard;

FIG. 2 is a diagram showing the IEEE 802 standard;

FIG. 3 is a block diagram of a wireless network according to a preferred embodiment of the present invention;

DETAILED DESCRIPTION OF PREFERRED EMBODIMENTS

Figure 4:
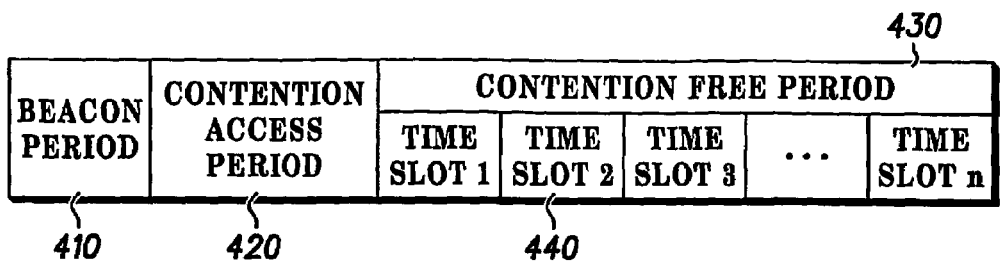
FIG. 4 is a block diagram of a superframe according to preferred embodiments of the present invention.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a medium access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Network

FIG. 3 is a block diagram of an exemplary wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course of the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320. This approach could also be applied to CSMA/CA embodiments as well.

Superframes

In a preferred embodiment, the available bandwidth in a given network 300 is split up in time by the coordinator 310 into a series of repeated superframes. These superframes define how the available transmission time is split up among various tasks. Individual frames of information are then transferred within these superframes in accordance with the timing provided for in the superframe.

FIG. 4 is a block diagram of a superframe according to preferred embodiments of the present invention. As shown in FIG. 4, each superframe 400 may include a beacon period 410, a contention access period (CAP) 420, and a contention free period (CFP) 430.

The beacon period 410 is set aside for the coordinator 310 to send a beacon frame out to the non-coordinator devices 320 in the network 300. Such a beacon period 410 will include information for organizing the operation of devices 310, 320 within the superframe 400. Each non-coordinator device 320 knows how to recognize a beacon 410 prior to joining the network 300, and uses the beacon 410 both to identify an existing network 300 and to coordinate communication within the network 300. In fact, since the beacon includes a preamble, the disclosed process is applicable to the beacon period 410 as well as to a frame preamble.

The CAP 420 is used to transmit commands or asynchronous data across the network. The CAP 420 may be eliminated in many embodiments and the system would then pass commands solely during the CFP 430.

The CFP 430 includes a plurality of time slots 440. These time slots 440 are assigned by the coordinator 310 to a single transmitting device 310, 320 and one or more receiving devices 310, 320 for transmission of information between them. Generally each time slot 440 is assigned to a specific transmitter-receiver pair, though in some cases a single transmitter will transmit to multiple receivers at the same time. In a preferred embodiment these time slots can be used to transmit administrative information between the coordinator 310 and one of the non-coordinator devices 320, or may be used for transmitting isochronous non-administrative data between devices 310, 320 in the network 300.

The superframe 400 is a fixed time construct that is repeated in time. The specific duration of the superframe 400 is described in the beacon 410. In fact, the beacon 410 generally includes information regarding how often the beacon 410 is repeated, which effectively corresponds to the duration of the superframe 400. The beacon 410 also contains information regarding the network 300, such as the identity of the transmitter and receiver of each time slot 440, and the identity of the coordinator 310.

The system clock for the network 300 is preferably synchronized through the generation and reception of the beacons 410. Each non-coordinator device 320 will store a synchronization point time upon successful reception of a valid beacon 410, and will then use this synchronization point time to adjust its own timing.

Although not shown in FIG. 4, there are preferably guard times interspersed between time slots 440 in a CFP 430. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310. For simplicity, a single guard time value may be used for the entire superframe. The guard time will preferably be placed at the end of each beacon frame and time slot.

Furthermore, although the preferred embodiment is used in a superframe structure, the present invention is equally applicable to embodiments that send frames outside of a superframe structure.

Frames

Figure 5:
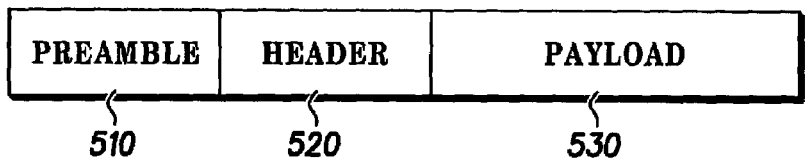
FIG. 5 is a block diagram of a frame according to a preferred embodiment of the present invention.

As noted above, signals are sent between devices in the form of frames. FIG. 5 is a block diagram of a frame according to a preferred embodiment of the present invention. Frames can be management frames, data frames, acknowledgement frames, etc. depending upon their payload.

As shown in FIG. 5, the frame 500 includes a preamble 510, a header 520, and a payload 530. Each frame 500 is preferably made up of a series of wavelets, with information in the frame 500 being represented by the wavelets or groups of wavelets called code words. In the preferred embodiment the receiving device 310, 320 is bi-phase modulated, meaning that one orientation of a wavelet or code word indicates a "1" and the inverted orientation of that wavelet or code word indicates a "0".

Although not shown, the frame 500 may include one or more check sequences (e.g. a cyclic redundancy check (CRC) to check for transmission errors. For example, the frame 500 could include a header check sequence at the end of the header 520 to perform a CRC on the header 520, and/or a frame check sequence at the end of the payload 530 to perform a CRC on the entire frame 500.

In the preamble 510, the transmitting device sends a known sequence of bits, while the receiving device 310, 320 listens for this known sequence in order to properly lock onto the signal. No substantive data is sent in the preamble 510, since the receiving device 310, 320 is still getting its timing synchronized with that of the transmitting device.

In a preferred embodiment the preamble comprises a pseudo-noise (PN) sequence that can be easily and repeatably generated, and that looks random to prevent spectral lines. In a preferred embodiment the PN sequence is generated using a $17^{th}$ order polynomial (e.g., the $17^{th}$ order trinomial: $x^{17}+x^{12}+1$). This can be implemented using a length 17 shift register with taps at the appropriate points leading to an XOR gate. The shift register can then be filled with a known seed value to start the shift register producing the PN sequence. In a preferred embodiment the start seed may be 1_1111_1111_1111_1111 or 0_0000_0000_0000_0100, i.e., the appropriate bit values are placed in parallel into corresponding shift registers.

The header 520 includes information about the intended recipient of the frame 500 and other identifying information. In the case where a plurality of frames include fragmented data, the header 520 should also include any information necessary to correctly reassemble the fragments contained in the plurality of frames.

The payload 530 includes the substantive information being transmitted by the frame 500. This can be data if the frame is a data frame, acknowledgement information if it is an acknowledgement frame, management information if it is a management frame, etc.

Preferably, the preamble 510 and the header 520 are of fixed size, while the payload 530 may vary in size. Thus, the size of a given frame 500 will generally vary depending upon the size of the payload 530 it carries.

Alternate embodiments may vary the preamble size however in some circumstances. For example, in one preferred embodiment a fast synchronization preamble can be used for second and subsequent packets (also called frames) sent from one device to another in a time slot. The devices can store acquisition and synchronization information between packets in a time slot and use that stored information to achieve a quicker acquisition/synchronization, allowing for a shorter preamble. In another preferred embodiment, different preamble sizes can be used depending upon signal quality (e.g., SNR). When SNR is good, a short preamble can be used, and when SNR is bad, a long preamble can be used. Multiple levels of preambles can also be used for varying SNR thresholds.

As noted above, however, it is desirable for the receiving device 310, 320 to obtain some information regarding how much time remains in the preamble 510 after a successful signal lock has been achieved. This would allow the receiving device 310, 320 to make certain it had enough time to perform and the receiver preparation functions (e.g., DFE training) necessary before receiving a frame payload. To accommodate this need, the preamble can be split into two preambles and an identifiable marker provided between the two preambles.

Figure 6:
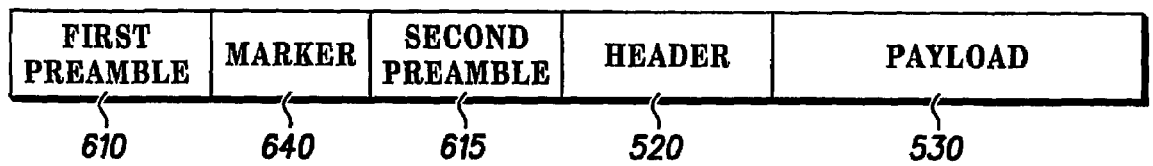
FIG. 6 is a block diagram of a frame according to another preferred embodiment of the present invention.

FIG. 6 is a block diagram of a frame according to another preferred embodiment of the present invention. As noted above, the frame could be a management frame, a data frame, an acknowledgement frame, etc. depending upon their payload.

As shown in FIG. 6, the frame 600 includes a first preamble 610, a second preamble 615, a header 520, a payload 530, and a marker sequence 640. Each frame 600 is preferably made up of a series of wavelets representing the bits of information in that frame 600. As noted above, the wavelets could themselves represent bits of information, or they could be grouped together as code words to indicate bits of information. As with the frame 500 of FIG. 5, the frame 600 in FIG. 6 could have one or more check sequences included.

The first and second preambles 610 and 615 preferably contain a known sequence of bits, as disclosed in the embodiment disclosed in FIG. 5. The first preamble 610 should be large enough to allow a signal locking operation (i.e., acquisition) to be performed, and may be long enough to allow for either longer than average locking operations (e.g., due to poor signal quality, etc.), or iterative locking operations (e.g., using multiple acquisition fingers to improve a locking position).

The second preamble 615 should be long enough to allow the receiving device 310, 320 to perform any training or receiver preparation operations required before it processes the header 520 and the payload 530.

Preferably both the first and second preambles 610 and 615 are generated in the same manner, e.g., both generated from the same polynomial. This simplifies implementation in the receiving device 310, 320 by only requiring it to recognize one known sequence rather than two. Regardless, the second preamble 615 is preferably a known sequence so that training can be performed more efficiently. For example, if the training is DFE training, such a DFE training operation requires known data.

In the alternative, the second preamble 615 could be referred to as a training period and the first preamble 610 could be referred to as just the preamble. Or the first preamble 610 could be referred to as the first portion of the preamble and the second preamble 615 could be referred to as the second portion of the preamble. Regardless of nomenclature, however, their operation would remain the same.

In a preferred embodiment the first and the second preambles 610 and 615 are generated with a known $17^{th}$ order generator polynomial.

The header 520 and the payload 530 are preferably formed the same as in the frame of FIG. 5.

The marker sequence 640 is a bit sequence placed between the first and second preambles 610 and 615 and is used to mark a known position in the frame 600. Preferably the marker sequence 640 is a bit sequence that does not appear either in the preamble 610 or 615, or in the header 520. It is also preferable that the marker sequence 640 be chosen so that statistically it is not likely to appear in the payload 530 as well, although this requirement can be eliminated in any embodiment in which the receiving device 310, 320 will not try and detect marker sequence 640 during the header 520 or the payload 530. The length of the marker can vary, but a marker that is a factor of two is preferable.

In particular, the marker sequence 640 should be chosen so that its bit sequence does not (or likely will not) appear during the time in which the receiving device 310, 320 will be trying to detect it. Also, the marker sequence 640 should be chosen so that its bit sequence will not likely be falsely detected as present during the time in which the receiving device 310, 320 will be trying to detect it. This is so that the receiving device 310, 320 will have no doubt as to when it detects the marker sequence 640. In general, however, any sort of marker that can be easily detected with a small chance of false detections can be used in place of the marker sequence 640.

The marker sequence 640 is preferably chosen such that it has extremely low cross correlation with the data sequence that makes up the first and second preambles 610 and 615 (e.g., the PN sequence described above). This is so that the probability of true detection of the marker sequence 640 by the receiving device 310, 320 is much greater than the probability of false detection of the marker sequence 640 during the first or second preambles 610 and 615.

In a preferred embodiment the marker sequence 640 is a programmable value that can be either 32 or 64 bits. However in alternate embodiments any other suitable length can be chosen that provides the necessary characteristics.

In preferred embodiment where the preamble is generated with the trinomial $x^{17}+x^{12}+1$, the marker may be chosen, by way of example to be 0001_1100_0011_1011_1001_ 0101_1001_0110 or 1001_0110_0101_0110_0010_ 0011_1100_0111, for a 32-bit marker, and 0x65f8_6bcb_ 4a9f_65c8 for a 64-bit marker. However, alternate embodiments can use different markers.

Frame Processing

Figure 7:
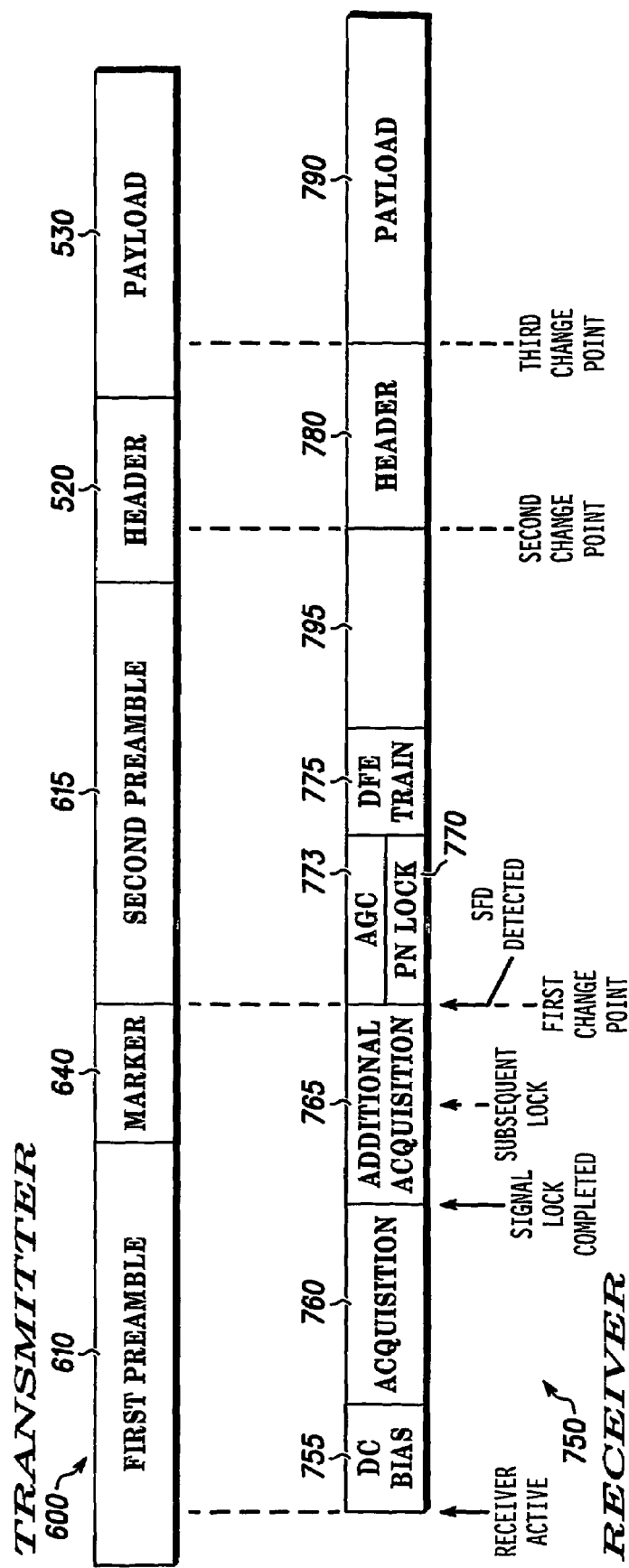
FIG. 7 is a diagram showing the timing of a signal containing an incoming frame and the operations performed on the incoming frame by a receiving device, according to a preferred embodiment of the present invention.

FIG. 7 is a diagram showing the timing of a signal containing an incoming frame and the operations performed on the incoming frame by a receiving device 310, 320, according to a preferred embodiment of the present invention. Although the receiving device 310, 320 may begin its processes at any point during a frame 600, it is shown as starting its receiving process just after the frame 600 arrives by way of example.

As shown in FIG. 7, a transmitter sends a frame 600 in a wireless signal. The frame includes a first preamble 610, a marker sequence 640, a second preamble 615, a header 520, and a payload 530. In receiving the frame 600, the receiver performs a number of processes including a DC bias process 755, an acquisition process 760, an additional acquisition process 765, a PN lock process 770, an automatic gain control (AGC) process 773, a decision feedback equalization (DFE) training process 775, a header receipt process 780, and a payload receipt process 790. Also, there may be remaining portions 795 in which additional processes could be performed or in which the receiving device 310, 320 may be idle.

In the DC bias process 755, the receiving device 310, 320 observes A/D levels, makes determinations about the detected bias levels, and programs digital-to-analog converters (DACs) within a receiver chain in such a way as to minimize the signal bias. In some embodiments the DC bias process 755 may be eliminated.

In the acquisition process 760, the receiving device 310, 320 initially listens to the incoming signal containing the frame and tries to achieve signal lock. This is performed by trying to match the phase (and possibly frequency) of a local clock to the phase (and possibly frequency) of the incoming signal. In a preferred receiving operation the receiving device 310, 320 will achieve signal lock sometime during the first preamble 610.

After signal lock is obtained, the receiving device 310, 320 will preferably begin listening for the marker sequence 640.

In the additional acquisition process 765, the receiving device 310, 320 may continue to perform locking operations after initial signal lock in order to try and improve the current signal lock. For example, if the receiving device 310, 320 has multiple receiving fingers, it can lock onto the incoming signal with the first finger to get a successful lock, but may continue to try and find a better signal lock with one or more other fingers. Because of the multipath nature of the wireless signals used in the network 300, multiple phase-shifted copies of the same signal may arrive at each receiving device 310, 320. Several of these phase-shifted copies may be of sufficient quality for lock, but some may be of higher quality than others. The multiple fingers can search through the other multipath signals to find one that will give a better signal lock. In some embodiments this additional acquisition process 765 can be omitted.

In the preferred embodiment, once the receiving device 310, 320 detects the marker sequence 640, it ends all acquisition processes (760 or 765) and begins performing the additional processes necessary for receiving the header 520 and payload 530. In this way the marker sequence 640 acts as a time reference for the rest of the frame 600. In particular, it indicates to the receiving device 310, 320 at what time it must begin post-acquisition operations in order to provide enough time for their completion before the header 520 arrives. As shown in FIG. 7, these post acquisition operations include the PN lock process 770, the AGC process 773, and the DFE training process 775. Additional processes could include data alignment from multiple fingers and RAKE training.

Preferably the receiving device 310, 320 will stop trying to detect the marker sequence 640 after it is successfully detected and will not start again until a new frame is received. This is to avoid the possibility of detecting the marker sequence 640 in the header 520 or payload 530, which can disrupt the processing of the signal.

In the PN lock process 770, the receiving device 310, 320 locks onto the specific PN sequence used in the second preamble 615. Although the receiving device 310, 320 has previously locked onto the phase of the incoming signal in the acquisition process 760 (and possibly the additional acquisition process 765), this only locked onto the clock phase, not the specific orientation of the PN sequence that makes up the first and second preambles 610 and 615. In the PN lock process 770, the receiving device 310, 320 synchronizes a local PN sequence generated by a local PN generator with the received PN sequence in the second preamble 615. This local PN sequence is identical to the received PN sequence since it is generated in the same manner (e.g., by the same polynomial). And by having a locally-generated copy of the PN sequence, the receiving device 310, 320 can better perform DFE or other training in the DFE or other training processes 775 or 795, since the data pattern is known and a locally-generated copy is available.

In the AGC process 773, the receiving device 310, 320 observes the A/D values of the incoming signal and adjusts the receiver gain and/or signal amplitude to maximize the effectiveness of the later following data processing stages. This process can include both an analog ACG process and a digital AGC process (i.e., normalization). In some embodiments the AGC process 773 may be eliminated.

In the DFE training process 775, the receiving device 310, 320 observes the incoming data stream, which has both noise and inter-symbol interference (ISI), and compares it to a noiseless version of the data generates after the PN lock process 770 has completed. Then, a set of DFE coefficients are determined that will make the incoming data stream look like the noise-free, ISI-free data.

Although the PN lock process 770, the AGC process 773, and the DFE training process 775 are shown in FIG. 7 as being performed in a serial manner, they can also be done in part or in whole in parallel, although the PN lock process 770 must be performed before the DFE training process 775. For example, in one preferred embodiment, the PN lock process 770 and the AGC process 773 are performed at the same time.

In addition, more or fewer training processes can be performed during this time. The training can enhance the ability of the receiver to process an incoming signal, but it is not essential.

In the header receipt process 780, the receiving device 310, 320 will receive and process the information in the header 520 and act upon it. Likewise, in the payload receipt process 790, the receiving device 310, 320 will receive and process the information in the payload 530 and act upon it.

As shown in FIG. 7, in the disclosed embodiment the frame 600 may have one or more change points during which it can change the transmission data rate or the code word set it uses. In particular, the frame 600 could change its data rate or code word set right after the marker sequence 640, right after the second preamble 615, or right after the header 520. In some embodiments, the instructions to change the data rate or code word set could be included in the header. In alternate embodiments, however, different points in the frame 600 can be chosen as change points.

If the data rate or code word set of the frame 600 is changed at one of these change points, the receiver will change its receiving process at the appropriate time to accommodate the different data rate or code word set. The placement of the change point and the different rates or code word sets could be preset for the network 300 in general, for a particular superframe 400, or for the particular time slot 440.

In alternate embodiments, the header 520 could include a flag indicating whether or not the data rate or code word set should be changed right after the header 520. In this case, the receiver will change its receiving process to accommodate a different data rate or code word set only if instructed to do so in the header 520.

By changing the data rate, the system allows the receiving device 310, 320 to perform some functions at a lower data rate and others at a higher data rate. For example, initial acquisition or training can be performed at a low data rate to allow for fewer errors in transmission. But then a higher rate could then be used for later operation to allow faster signal processing and data transfer. In some implementations the second data rate might be higher than would be feasible to use during the first preamble 610 because of quality of service constraints (i.e., without trained DFE or RAKE, the higher speed would cause too many bit errors). But once DFE is properly trained, the higher data rate can be used with an acceptable number of bit errors.

By changing the code word set, the system allows the receiving device 310, 320 to perform a first process using a code word set suited to that first process, while performing a second process using a second code word set better suited to the second process. For example, a transmitting device 310, 320 could start the frame 600 using a first code word set well suited to acquisition. Then, at one of the change points, the transmitting device 310, 320 could move to using a second code word set more suited to receiving data. The code words in these code word sets could be of the same size or of different sizes in varying embodiments.

Figure 8:
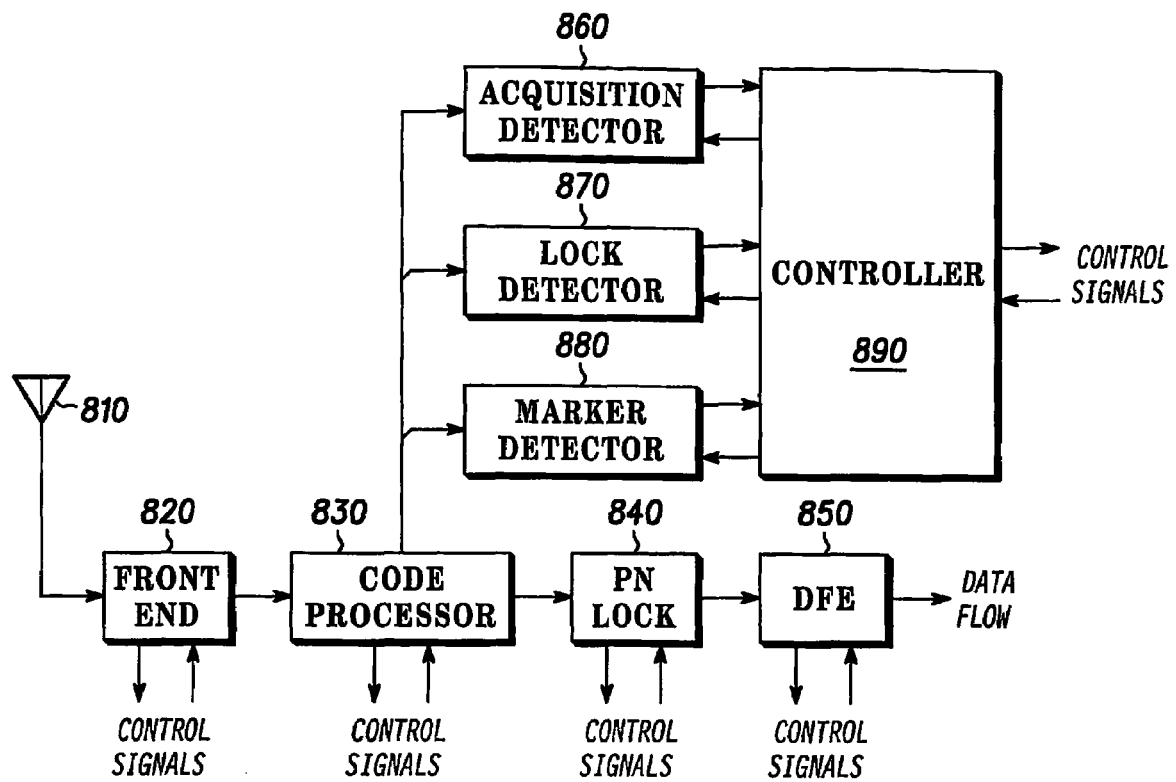
FIG. 8 is a block diagram of a device from the network of FIG. 3.

FIG. 8 is a block diagram of a receiver portion of a device from the network of FIG. 3. As shown in FIG. 8, each device (i.e., each coordinator 310 or non-coordinator device 320) includes an antenna 810, a front end 820, a code processor 830, a pseudo-noise (PN) lock circuit 840, a digital feedback equalizer (DFE) circuit 850, an acquisition detector 860, a lock detector 870, a marker detector 880, and a controller 890.

The antenna 810 is preferably an ultrawide bandwidth (UWB) antenna configured to receive UWB signals. This may be a dedicated receiving antenna or may be shared with a transmitter portion of the device 310, 320.

The front end 820 is used to perform a variety of signal processing operations on an incoming signal. This can include the DC bias process 755 and an AGC process 773, as well as signal mixing integration.

The code processor 830 is used to generate local code words used for detecting code words in the received signal.

The PN lock circuit 840 performs the PN locking process 770 during the second preamble 615. In doing so, it synchronizes a local PN generator (preferably contained in the PN Lock circuit 840) with the PN sequence in the second preamble 615.

The DFE circuit 850 performs DFE operations on the incoming data to remove ISI from the incoming data stream. The DFE circuit 850 preferably performs DFE training during the DFE training process 775 to determine the necessary DFE parameters (i.e., the DFE coefficients) to properly perform the DFE function on the header 520 and payload 530.

The acquisition detector 860 monitors the incoming signal and determines the necessary operations required to synchronize a local clock with the phase of the incoming signal. The acquisition detector may have a single locking finger, or may have multiple locking fingers.

The lock detector 870 monitors the incoming signal after acquisition to ensure that the lock point remains sufficient to receive data. If the lock detector determines the signal on the locked finger is too weak, the finger will unlock and the acquisition process will continue for that finger.

The marker detector 880 monitors the incoming signal to determine when the marker sequence 640 has been received. Preferably the marker detector 880 begins operation when the acquisition detector 860 indicates that initial lock is achieved, and stops operation when it detects the marker sequence 640.

The controller 890 receives control signals from and supplies control signals to the front end 820, the code processor 830, the PN lock circuit 840, the DFE circuit 850, the acquisition detector 860, the lock detector 870, and the marker detector 880.

Figure 9:
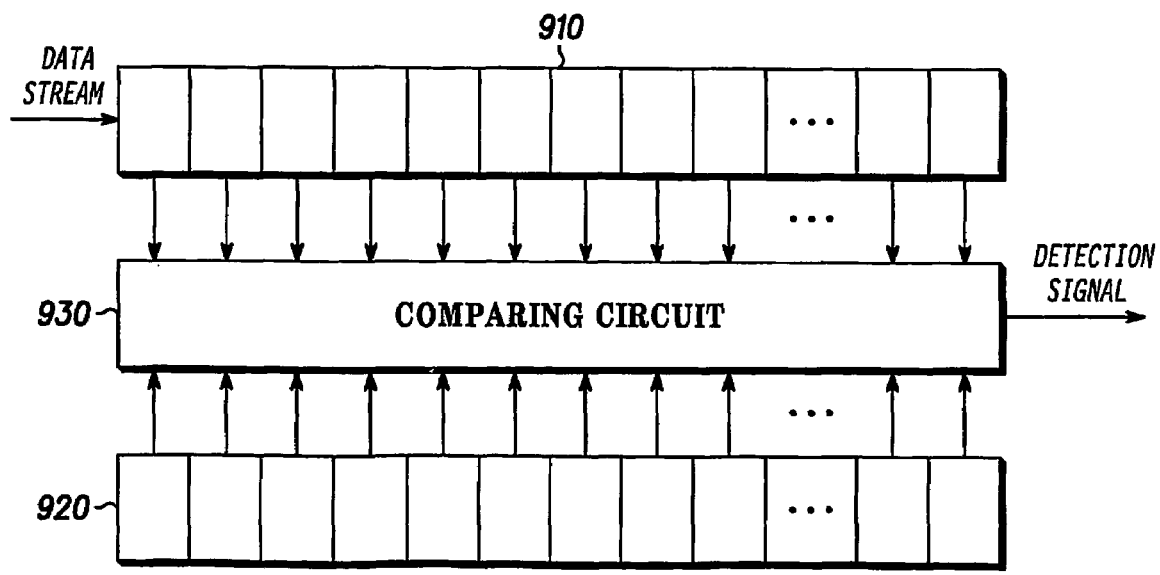
FIG. 9 is a block diagram of a marker detector of FIG. 8 according to a preferred embodiment of the present invention.

FIG. 9 is a block diagram of a marker detector 880 of FIG. 8 according to a preferred embodiment of the present invention. As shown in FIG. 9, the marker detector 880 includes a shift register 910, a fixed register 920, and a comparing circuit 930.

The shift register 910 is the length of the marker sequence 640 and receives the incoming signal bit-by-bit. The fixed register 920 is also the length of the marker sequence 640 and contains a copy of the marker sequence 640. In the preferred embodiment, the shift register 910 and the fixed register 920 are either 32 or 64 bits long. This can vary in alternate embodiments, and can even be selectable.

The comparing circuit 930 compares the contents of the shift register 910 with the contents of the fixed register 920 to determine how many errors there are between the two. When the number of errors meets a set criterion, the comparing circuit provides a detection signal to the controller 890 indicating that the marker sequence 640 has been detected. In one preferred embodiment the set criteria is to have a 32-bit marker sequence 640 have two or fewer errors, and to have a 64-bit marker sequence 640 have five or fewer errors. However, this may vary in alternate embodiments. For this reason, in preferred embodiments the exact number of errors is preferably programmable to account for varying accuracy needs.

Figure 10:
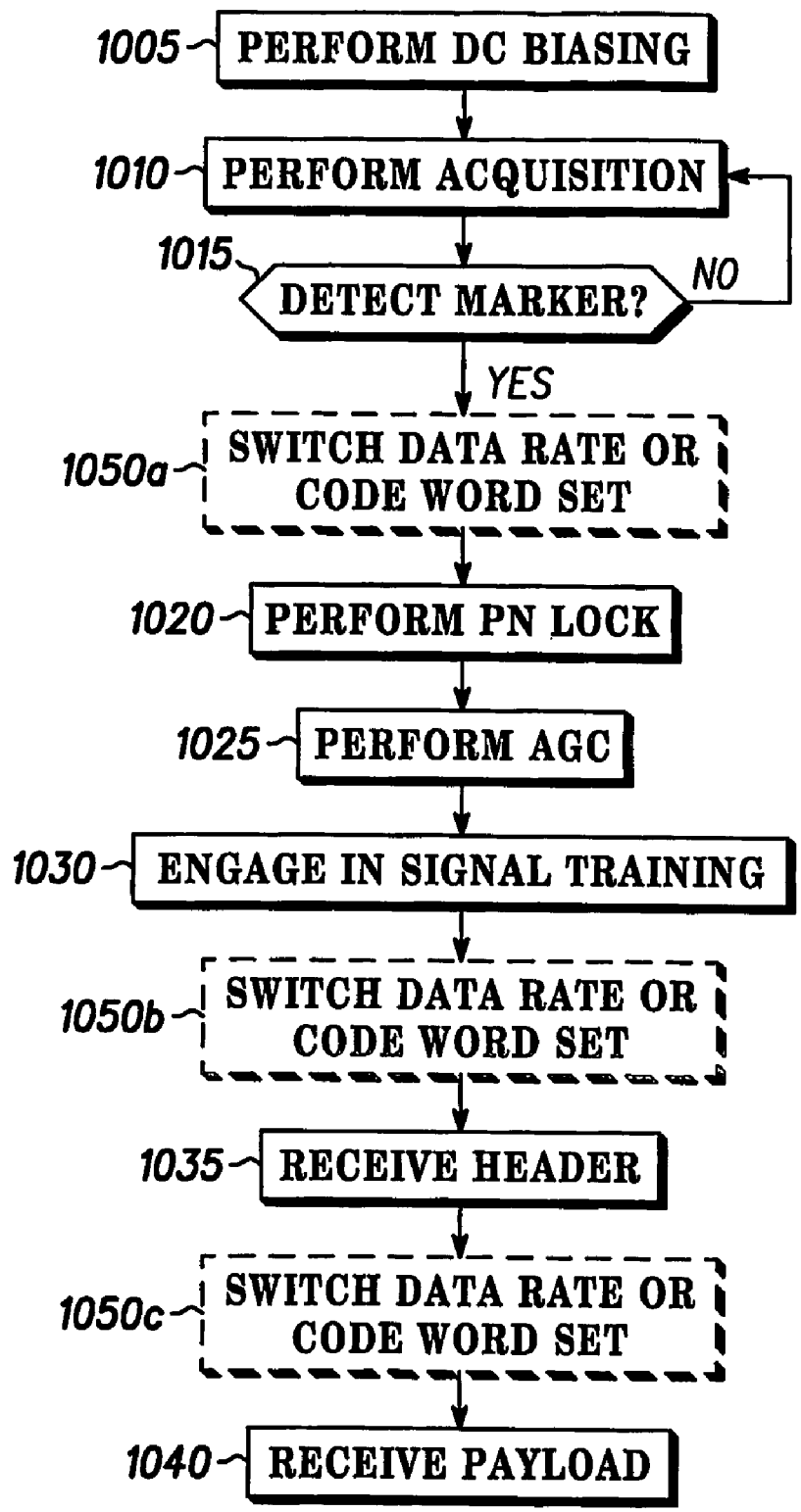
FIG. 10 is a flow chart showing a frame receiving operation of the device of FIG. 9 according to a preferred embodiment of the present invention.

FIG. 10 is a flow chart showing a frame receiving operation of the device of FIG. 8 according to a preferred embodiment of the present invention. As shown in FIG. 10, the receiving device 310, 320 starts by performing a DC biasing operation on the incoming signal. (Step 1005) In some embodiments this step can be omitted.

After the DC biasing operation 1005, the receiving device 310, 320 performs an acquisition operation 1010. In this embodiment, an iterative acquisition process is performed (corresponding to the additional acquisition process 765 in FIG. 7) to continually refine the acquisition lock.

Specifically, once initial acquisition is achieved 1010, the receiving device 310, 320 determines whether the marker sequence 640 has been detected. (Step 1015) If no marker sequence 640 has been detected, then the receiving device 310, 320 returns to an acquisition process (Step 1010), and continues to refine the acquisition lock. In some alternate embodiments receiving device 310, 320 could simply wait after a lock to detect the marker sequence 640. In this case, i.e., when step 1015 indicates no marker sequence 640 is detected, the detecting step would iteratively return back to itself and continue trying to detect the marker sequence 640. In other alternate embodiments the receiving device 310, 320 could iteratively enter into a tracking state as it continues to try and detect the marker sequence 640.

Once the marker sequence 640 is detected in step 1015, the receiving device 310, 320 then performs a PN locking process (Step 1020), an AGC process (Step 1025), and a signal training process (Step 1030). In a preferred embodiment, this signal training 1030 is DFE training. These various signal processing and monitoring steps (1020-1030) can be performed in varying orders and can be done either serially or in parallel. In addition, other signal processing and monitoring steps may be included as well.

Finally, after all of the signal processing and monitoring steps are performed, the receiving device 310, 320 receives the frame header 520 (Step 1035) and then receives the frame payload 530 (Step 1040).

In addition, the process may also include a function of switching the data rate or the code word set for receiving the frame 600. This can be performed after detecting the marker sequence 640, i.e., after the marker sequence 640 in the frame 600 (Step 1050*a*), after all of the signal processing and monitoring operations are completed, i.e., after the second preamble 615 in the frame 600 (Step 1050*b*), or after the header 520 is received (Step 1050*c*).

This method and apparatus according to the disclosed embodiments allows the receiving device 310, 320 to perform acquisition of an incoming signal while insuring that any received frame 600 will only be processed if the receiving device 310, 320 has time after acquisition to perform the necessary training and signal processing steps necessary for proper receipt of the data contained in the frame 600.

As shown in FIG. 10, until the marker sequence 640 is received in step 1015, the receiving device 310, 320 will continue to iteratively refine the acquisition process. If, for example, the receiving device 310, 320 locked onto the incoming signal during the second preamble 615 (i.e., when there would be insufficient time for training and signal processing before the header 520), then it would not detect the marker sequence 640 (it having already passed), and would not stop acquiring for the remainder of the frame 600 (or however long its protocol requires it to continue trying to acquire).

In some embodiments the receiving device 310, 320 could stop acquiring the incoming signal after a timer indicated that a set period of time had passed with no marker sequence 640 detected. In other embodiments the receiving device 310, 320 could keep acquiring through the entire frame 600 and into the next frame 600, at which time it would detect the marker sequence 640 in that second frame 600.

This requirement to detect the marker sequence 640 before moving to further processing may cause the receiving device 310, 320 to miss an entire frame. But it will also prevent the receiving device 310, 320 from starting processing of a frame 600 before it is prepared to do so (e.g., before DFE training is finished). This reduces the chance of errors in processing the frame and simply requires that the frame be resent. However, this is acceptable in a preferred embodiment because the probability of a receiving device 310, 320 missing the marker 640 is much lower than the probability of a receiving device 310, 320 failing to successfully receive a frame after failing to perform proper training.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of receiving a data frame in an ultrawide bandwidth network, comprising:
    receiving an ultrawide bandwidth signal containing a data frame;
    performing an acquisition operation during a first preamble in the data frame;
    identifying a marker after the first preamble that indicates that the first preamble has ended;
    performing a signal processing operation during a second preamble in the data frame, after identifying the marker;
    performing an automatic gain control operation on the received ultrawide bandwidth signal during the second preamble, after identifying the marker;
    receiving a header in the data frame, after performing the signal processing operation and after performing the automatic gain control operation; and
    receiving a payload in the data frame, after receiving the header.

2. A method of receiving a data frame in an ultrawide bandwidth network, as recited in claim 1, wherein the signal processing step is a signal training step.

3. A method of receiving a data frame in an ultrawide bandwidth network, as recited in claim 1, implemented in an ultrawide bandwidth transceiver.

4. A method of receiving a data frame in an ultrawide bandwidth network, as recited in claim 1, implemented in an integrated circuit.

5. A method of receiving a data frame in an ultrawide bandwidth network, as recited in claim 1, further comprising performing a pseudo-noise lock on the received ultrawide bandwidth signal during the second preamble, after identifying the marker and before receiving the header.

6. A method of receiving a data frame in an ultrawide bandwidth network, as recited in claim 1, further comprising changing a received data rate for the incoming ultrawide bandwidth signal from a first data rate to a second data rate after performing the acquisition operation and before receiving the payload.

7. A method of receiving a data frame in an ultrawide bandwidth network, as recited in claim 6, wherein the changing of the received data rate is performed during one of:
    after receiving the marker and before performing the signal processing operation, after performing the signal processing operation and before receiving the header, and after receiving the header and before receiving the payload.

8. A method of receiving a data frame in an ultrawide bandwidth network, as recited in claim 1, further comprising changing a receiving code word set for the incoming ultrawide bandwidth signal from a first code word set to a second code word set after performing the acquisition operation and before receiving the payload.

9. A method of receiving a data frame in an ultrawide bandwidth network, as recited in claim 8, wherein the changing of the receiving code word set is performed during one of: after receiving the marker and before performing the signal processing operation, after performing the signal processing operation and before receiving the header, and after receiving the header and before receiving the payload.

10. A method of receiving a data frame in an ultrawide bandwidth network, as recited in claim 1, wherein identifying the marker further comprises:
    receiving a plurality of bits;
    comparing the plurality of bits with a stored bit sequence; and
    identifying the marker as having been received when the plurality of received bits match the stored bit sequence with no more than an allowable number of bit differences between corresponding received bits and stored bits.

11. A method of receiving a data frame in an ultrawide bandwidth network, as recited in claim 10, wherein the allowable number of bit differences is between 0 and 10.

12. A method of receiving a data frame in an ultrawide bandwidth network, as recited in claim 1,
  wherein the marker is a sequence of N bits, N being an integer greater than 1, and
  wherein the sequence of N bits does not appear in either the first preamble or the second preamble.

13. A receiver in an ultrawide bandwidth network, comprising:
  a code processor configured to receive an ultrawide bandwidth signal containing a data frame;
  an acquisition detector configured to perform an acquisition operation during a first preamble in the data frame;
  a marker detector configured to identify a marker after the first preamble that indicates that the first preamble has ended;
  a decision feedback equalizer circuit configured to perform a receiver training operation during a second preamble in the data frame, after identifying the marker; and
  an automatic gain control circuit configured to perform an automatic gain control operation on the received ultrawide bandwidth signal during the second preamble, after identifying the marker.

14. A receiver in an ultrawide bandwidth network, as recited in claim 13, wherein the marker detector further comprises:
  a shift register of length N for receiving a data stream;
  a static register of length N for holding a marker bit value; and
  a comparing circuit for comparing the contents of the shift register with the contents of the static register to determine the number of bit errors between corresponding entries in the shift register and the static register,
  wherein N is an integer greater than 1.

15. A receiver in an ultrawide bandwidth network, as recited in claim 14, wherein the controller determines that the marker has been detected when the number of bit errors determined by the comparing circuit meets an accepted threshold.

* * * * *